3,209,683
PLANOGRAPHIC PRINTING PLATE
Paul W. Greubel, Short Hills, N.J., assignor to Interchemical Corporation, New York, N.Y., a corporation of Ohio
No Drawing. Filed July 16, 1963, Ser. No. 295,539
10 Claims. (Cl. 101—149.2)

This invention relates to improvements in a new planographic printing plate. My copending application S.N. 141,540, filed September 28, 1961, now U.S. Patent No. 3,167,005, relates to a new method of planographic printing which does not use the water fountain solution conventionally used in lithographic printing thereby permitting the use of inks other than oil inks, resin-hydrocarbon inks, or oleoresinous inks in planographic printing. The copending application describes a new planographic method of printing permitting the use of substantially odorless non-oily or non-oleoresinous inks. The novel process of this invention is based upon the mutual immiscibility between volatile aliphatic hydrocarbons and odorless non-oily or non-oleoresinous inks. The new planographic method employs a novel planographic plate described in my copending application entitled "A New Planographic Printing Plate and Method for Producing Same," S.N. 141,538, filed on September 28, 1961, in which plate, the non-image areas are rendered retentive of the volatile aliphatic hydrocarbons by a coating of a silicone which covers the non-image areas. Using conventional lithographic equipment a fountain solution consisting of the volatile aliphatic hydrocarbon is applied to the plate prior to the application of ink. When the ink is subsequently applied, it is prevented from depositing on the non-image areas by the aliphatic hydrocarbon covering such areas and the ink only deposits in the image areas which being exposed metal are preferentially wetted by the ink. The image thus formed is subsequently transferred either directly to the stock being printed, or, as in offset printing, to a rubber blanket from which it is then retransferred to the stock being printed. This plate comprises a base metal plate suitably made of zinc having a printed surface on which the image areas are the exposed metal and the non-image areas are coated with a cured thermosetting silicone. Other conventional planographic plate metals such as aluminum may also be used for the base metal. The silicones preferably used to coat the non-image areas are thermosetting alkyl and aryl substituted polysiloxanes including thermosetting alkyl siloxanes such as dimethylpolysiloxane resin, thermosetting alkyl-aryl polysiloxanes, for example a methylphenylpolysiloxane having an average degree of substitution of 1.3 methyl and phenyl radicals per silicone atom. Very good results have been achieved with a thermosetting polysiloxane copolymer comprising 37% by weight of dimethylsiloxane units $(CH_3)_2SiO$), 56% of phenyl siloxane units $(C_6H_5SiO_{1.5})$ and 7% methyl siloxane $(CH_3SiO_{1.5})$.

In the practice of the invention set forth in my application S.N 141,540, preferably aliphatic hydrocarbons having a boiling range from 145° F. to 390° F. are used. The hydrocarbon can not be too volatile since this would cause the solvent applied to the plate to evaporate before the ink is applied. On the other hand, if the hydrocarbon exaporates too slowly, it is carried into the ink distribution system and affects the ink. Some commercially available aliphatic hydrocarbons which have been found to be suitable for this process are "Textile Spirits," an aliphatic hydrocarbon having a boiling range of 145–175° F. and a K.B. value of 32.8, "Amsco Supernaphtholite" having a boiling range of 247° to 287° F. and a K.B. value of 33.8; and "Varnolene" having a boiling range of 310–380° F. and a K.B. value of 37.4.

Among the inks providing good results in the practice of the process described in application S.N. 141,540 are inks using glycol solvents. The lower glycols, pentanediol and below as well as glycol ethers have been found to be immiscible with the aliphatic hydrocarbons. The glycol inks utilizable in this process include inks having diethylene glycol, dipropylene glycol, propylene glycol, triethylene glycol, and 1,5-pentanediol as solvents. It should also be noted that the glycol inks have moisture setting properties. Application S.N. 141,540 also sets forth glycerin based inks as being suitable.

While the method of copending application S.N. 141,540, using the plate of application S.N. 141,538, provides excellent printed matter, the plates have been subject to blinding or obscuring of the image areas after use for some time. This is markedly apparent where there is used in the aliphatic hydrocarbon fountain solution, in accordance with the teachings of my copending application S.N. 289,742, filed on June 21, 1963, entitled "Planographic Printing Improvements," small amounts of higher alkyl phosphate esters, e.g., mono-octyl acid orthophosphate or the phosphate esters of technical lauryl alcohol. These phosphate esters are used to cut down on ink pick-up in the non-image areas. However, they have the additional effect of accelerating the blinding of the image areas.

I have discovered that by coating the image areas, which are bare metal in the plates of copending application S.N. 141,538, with light-hardened bichromated protein coatings, blinding is markedly retarded. The bichromated protein coatings which are also known as "albumin type" coatings comprise an alkali bichromate particularly ammonium bichromate together with a protein base which may be albumin or other proteins such as casein or soya bean protein.

The applied coating preferably comprises from 3 to 4 parts of protein by weight on a solid basis for each part of ammonium bichromate.

In the present specification and claims, all proportions are by weight unless otherwise stated.

The following examples will illustrates the practice of the invention—

*Example 1*

A. *Preparation of the silicone resin coated plate*

A plate in which the non-image areas are coated with a thermoset silicone is prepared in accordance with the procedure of copending application S.N. 141,538, as follows:

The grained surface of an aluminum metal base is counteretched or cleaned with a weak acid solution in accordance with conventional photolithographic "deep-etch" procedures. Still following these conventional procedures, the plate surface is coated with a "deep-etch" coating which comprises a light sensitive film of gum arabic and a bichromate such as ammonium bichromate. Some conventional coating formulas are described on pages 25 and 26 of L.T.F. (Lithographic Technical Foundation) publication, "Offset Platemaking-Deep-Etch Process," published 1955. The coating is preferably applied while the plate is in a whirler. The plate is allowed to remain in the whirler until the coating is dry.

Then the sensitized surface is placed under a negative having a transparent pattern in an opaque field and exposed through the negative to strong light such as an arc light. This exposure hardens the light sensitive coating on the image areas. The plate surface is then treated with a developer conventionally used in the "deep-etch" process such as an aqueous solution of calcium chloride and lactic acid or a zinc chloride, calcium chloride and lactic acid solution. Some conventional developer formulas are given on p. 105 of the above referred to L.T.F. publication. The developer is applied and rubbed gently for 1½ minutes. Developing removes the unhardened bichromated-gum coatings from the non-image areas of the plate.

The next step is deep etching of the plate. While this step may be omitted, for best results, it is preferable to treat with a deep-etching solution for about one minute. This solution contains a strong acid that attacks and eats away some of the exposed metal in the non-image areas thereby insuring better adhesiveness of the silicone to be subsequently applied. Some conventional deep-etching solutions are given on p. 114 of the above-described L.T.F. publication. The deep-etched non-image areas are then cleaned with anhydrous ethyl alcohol to remove all traces of moisture and water soluble salts. Other solvents may be used in place of anhydrous ethyl alcohol. These are described on p. 119 of the above described L.T.F. publication.

The silicone coating (a thermosetting polysiloxane copolymer comprising 37% by weight of dimethylsiloxane units, 56% of phenylsiloxane units and 7% methyl siloxane units) is then applied to the surface of the plate by spreading the coating with rags or gauze and is allowed to air dry from 5 to 15 minutes. It should be pointed out, here, that if the silicone composition is too viscous to be spread easily, it may be diluted with a volatile organic solvent such as xylene or toluene. The coated plate is then immersed in water at 90° to 100° F. and scrubbed with a hard brush. The hardened bichromate-gum arabic coating covering the image area, being water soluble, dissolves carrying with it any silicone which may be coated over it and exposing the bare metal in the image areas.

The plate is then heated to a temperature sufficiently high to thermoset the silicone coating. This is preferably accomplished by baking the plate at temperatures preferably in the range from about 500° F. to 700° F. for periods advantageously ranging from 5 to 90 minutes. The time required for the bake varies inversely with the temperature. For example, when the baking is carried out at 500° F., the time required is about 90 minutes. However, when the temperature is raised to 670° F. the baking time is lowered to 5 minutes. Alternatively, the silicone coating may be heated to set by flame curing. Convenient temperatures for flame curing are in the order of 750° to 800° F. for times in the order of 2 to 6 seconds.

B. *Applying the albumin coating to image areas*

A coating containing 11 parts of albumin, 2.7 parts of ammonium bichromate and 86.3 parts of water is then coated upon said plate at about the same dry thickness as the silicone resin film (.0004 inch). Then, the albumin layer is exposed to strong light as from an arc light for about 4 to 5 minutes.

The plate is then wiped or rubbed with a cloth soaked with an aliphatic hydrocarbon solvent (Textile Spirits, having a boiling range of 145° F. and a K.B. value of 32.8). The hardened albumin coating is readily removed by this wiping from the silicone resin coated non-image areas, but remains intact covering the metal in the image areas.

The resulting plate is used in the planographic printing process described in copending application S.N. 141,540 using a fountain solution comprising a volatile aliphatic hydrocarbon having a boiling range of 247° to 287° F. and a K.B. value of 33.8, said hydrocarbon having dissolved therein 0.1% (based upon fountain solution weight) of a mixture of the monoalkyl and dialkyl phosphate esters of technical grade lauryl alcohol (55.9% dodecanol, 2.5% decanol, 21% tetradecanol, 10.2% hexadecanol and 10.8% of octadecanol). The ink used is a conventional glycol ink containing 57 parts triethylene glycol, 15 parts of zein, 26 parts carbon black pigment and 2 parts of alkali blue pigment. After 100,000 impressions there is no blinding or fading in the image areas.

EXAMPLE 2

For comparison purposes, Example 1 is repeated using the same procedure, conditions, all of the same ingredients and proportions except that in place of plate of this invention having the albumin layer in the image areas, there is used the plate of copending application S.N. 141,538, which has no albumin in the image areas. After 27,000 impressions blinding in the image areas begins to occur.

EXAMPLE 3

Example 1 is repeated using the same procedure, conditions and all of the same ingredients and proportions except that in place of the albumin coating, the following coating is used:

Casein _____ g__ 100
Water _____ cc__ 1350
Ammonium hydroxide (28% $NH_3$) _____ cc__ 15
Ammonium bichromate [$(NH_4)_2Cr_2O_7$], 20% stock
  solution _____ cc__ 192

Likewise, after 100,000 impressions no blinding occurs.

EXAMPLE 4

Example 1 is repeated using the same procedure, conditions and all of the same ingredients and proportions except that in place of the albumin coating the following coating is used:

cc.
Soybean solution, 4° Baumé _____ 946
Ammonium bichromate, 20% solution _____ 192
Water _____ 237

After 100,000 impressions, no blinding occurs.

While there have been described what is at present considered to be the preferred embodiments of this invention, it will be obvious to those skilled in the art that various changes and modifications may be made therein without departing from the invention, and it is, therefore aimed to cover all such changes and modifications as fall within the true spirit and scope of the invention.

What is claimed is:

1. A planographic printing plate comprising a metal surface coated with a discontinuous cured layer of a thermosetting silicone resin, said surface being coated with a light-hardened bichromated protein film in areas uncoated by said silicone resin, said protein coated areas corresponding to a selected image to be printed.

2. The planographic printing plate of claim 1, wherein said thermosetting silicone resin is a polysiloxane comprising at least one monomer selected from the group consisting of alkyl siloxanes and aryl siloxanes.

3. The planographic printing plate of claim 2, wherein said bicromated protein film is formed of ammonium bichromate and casein.

4. The planographic printing plate of claim 2, wherein said bichromated protein film is formed of albumin and ammonium bichromate.

5. The planographic printing plate of claim 2, wherein said bichromated film is formed of soya bean protein and ammonium bichromate.

6. The planographic printing plate defined in claim 2, wherein said thermosetting polysiloxane comprises dimethylsiloxane monomers.

7. The planographic printing plate defined in claim 2, wherein said thermosetting polysiloxane is methyl phenylpolysiloxane.

8. The planographic printing plate defined in claim 2, wherein said thermosetting polysiloxane comprises dimethyl siloxane monomers, phenyl siloxane monomers and methylsiloxane monomers.

9. The planographic printing plate claimed in claim 1, wherein said metal surface is aluminum.

10. The planographic printing plate claimed in claim 1, wherein said metal surface is grained zinc.

References Cited by the Examiner

UNITED STATES PATENTS 2,804,388   8/57   Marron et al.

DAVID KLEIN, *Primary Examiner.*